United States Patent
Ahn et al.

(10) Patent No.: US 11,082,379 B2
(45) Date of Patent: Aug. 3, 2021

(54) METHODS, SYSTEMS, DEVICES, AND NON-TRANSITORY COMPUTER READABLE RECORD MEDIA FOR FILTERING IMAGES USING KEYWORDS

(71) Applicant: LINE Plus Corporation, Seongnam-si (KR)

(72) Inventors: Jong Youn Ahn, Seongnam-si (KR); Donghyun Kim, Seongnam-si (KR); Hey Young Yun, Seongnam-si (KR); Hyukjae Jang, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 16/440,043

(22) Filed: Jun. 13, 2019

(65) Prior Publication Data
US 2019/0394154 A1    Dec. 26, 2019

(30) Foreign Application Priority Data
Jun. 20, 2018    (KR) .................. 10-2018-0070594

(51) Int. Cl.
*G06F 15/16* (2006.01)
*H04L 12/58* (2006.01)
(Continued)

(52) U.S. Cl.
CPC ............ *H04L 51/12* (2013.01); *G06F 16/535* (2019.01); *G06F 16/54* (2019.01);
(Continued)

(58) Field of Classification Search
CPC ....... H04L 51/12; H04L 51/10; G06F 16/535; G06F 16/5866; G06F 16/54
See application file for complete search history.

(56) References Cited

U.S. PATENT DOCUMENTS 5,936,682 A * 8/1999 Thomas ................ H04N 9/646
                                                              348/625
6,356,908 B1 * 3/2002 Brown .................. G06F 16/957
(Continued)

FOREIGN PATENT DOCUMENTS

KR    10-2002-0074304 A    9/2002
KR    10-2012-0007045 A    1/2012
(Continued)

OTHER PUBLICATIONS

Korean Office Action dated Oct. 15, 2019 for KR Patent Application No. 10-2018-0070594.
(Continued)

*Primary Examiner* — Douglas B Blair
(74) *Attorney, Agent, or Firm* — Harness, Dickey & Pierce, P.L.C.

(57) ABSTRACT

Provided are methods, systems, electronic devices, and/or computer-readable media that involve filtering images based on keywords, such as keywords extracted from the image. An image filtering method implemented on an electronic device may include receiving a chat message including information on an image sent from another electronic device through a chatroom of a messenger and filtering an image corresponding to the chat message based on a keyword that is extracted from the image.

20 Claims, 12 Drawing Sheets

(51) Int. Cl.
*G06K 9/00* (2006.01)
*G06F 16/535* (2019.01)
*G06F 16/54* (2019.01)
*G06F 16/58* (2019.01)

(52) U.S. Cl.
CPC ..... *G06F 16/5866* (2019.01); *G06K 9/00536* (2013.01); *H04L 51/10* (2013.01)

(56) References Cited

U.S. PATENT DOCUMENTS

| | | | | |
|---|---|---|---|---|
| 7,222,306 | B2* | 5/2007 | Kaasila | G09G 5/24 |
| | | | | 715/801 |
| 8,175,388 | B1* | 5/2012 | Fisher | G06K 9/3208 |
| | | | | 382/181 |
| 9,282,087 | B1* | 3/2016 | Fredinburg | H04L 63/102 |
| 9,392,101 | B2* | 7/2016 | Graham | G06Q 10/107 |
| 9,471,676 | B1* | 10/2016 | Berent | G06F 16/745 |
| 9,876,848 | B1* | 1/2018 | Carroll | H04L 67/10 |
| 10,867,119 | B1* | 12/2020 | Karppanen | G06F 40/146 |
| 2008/0050016 | A1* | 2/2008 | Kawano | G06F 21/10 |
| | | | | 382/175 |
| 2008/0056574 | A1* | 3/2008 | Heck | G06F 16/338 |
| | | | | 382/177 |
| 2011/0267490 | A1* | 11/2011 | Goktekin | H04N 1/00307 |
| | | | | 348/222.1 |
| 2012/0167047 | A1* | 6/2012 | Wyler | H04W 4/00 |
| | | | | 717/122 |
| 2013/0346337 | A1* | 12/2013 | O'Donnell | G06Q 10/0833 |
| | | | | 705/333 |
| 2014/0037183 | A1* | 2/2014 | Gorski | G06K 9/00449 |
| | | | | 382/138 |
| 2014/0037184 | A1* | 2/2014 | Gorski | G07D 7/20 |
| | | | | 382/138 |
| 2017/0201571 | A1* | 7/2017 | Sherf | H04L 67/1029 |
| 2018/0060743 | A1* | 3/2018 | Chak | G06N 5/04 |
| 2018/0083901 | A1* | 3/2018 | McGregor, Jr. | H04L 51/32 |
| 2018/0173725 | A1* | 6/2018 | De Guerre | G06F 16/5866 |
| 2018/0197223 | A1* | 7/2018 | Grossman | G06K 9/4619 |
| 2018/0336415 | A1* | 11/2018 | Anorga | G06K 9/00671 |
| 2019/0379618 | A1* | 12/2019 | Rabbat | H04L 51/10 |

FOREIGN PATENT DOCUMENTS

| | | |
|---|---|---|
| KR | 10-2016-0029164 A | 3/2016 |
| KR | 10-2018-0001907 A | 1/2018 |

OTHER PUBLICATIONS

Korean Office Action for Korean Patent Application No. 10-2018-0070594 dated May 13, 2019.

* cited by examiner

METHODS, SYSTEMS, DEVICES, AND NON-TRANSITORY COMPUTER READABLE RECORD MEDIA FOR FILTERING IMAGES USING KEYWORDS

CROSS-REFERENCE TO RELATED APPLICATION(S)

This U.S. non-provisional application claims the benefit of priority under 35 U.S.C. § 119 to Korean Patent Application No. 10-2018-0070594, filed on Jun. 20, 2018 in the Korean Intellectual Property Office (KIPO), the entire contents of which are incorporated herein by reference.

BACKGROUND

Field

One or more example embodiments relate to technology for filtering an image.

Description of Related Art

An instant messenger that is a typical communication tool refers to software capable of sending and receiving messages or data in real time. A user may register a chat partner, that is, a contact on the messenger and may exchange messages with a counterpart included in a contact list.

This messenger function is popular in a mobile environment of a mobile communication terminal as well as a personal computer (PC).

For example, a service system and method for a mobile messenger of a mobile phone using a wireless communication network to provide a messenger service between mobile messengers installed on mobile phones is disclosed in Korean Patent Laid-Open Publication No. 10-2002-0074304 (published on Sep. 30, 2002).

In general, a messenger supports, for example, a function of sharing a variety of information, such as photos, videos, files, contacts, locations, and schedules, and a function of searching for a chat message or sharing information.

SUMMARY

One or more example embodiments may include methods, systems, devices, and/or computer-readable media that may involve image filtering using keywords based on images.

According to an aspect of at least one example embodiment, there is provided an image filtering method implemented on an electronic device including processing circuitry configured to execute computer-readable instructions included in a memory, the image filtering method including receiving, by the processing circuitry, a chat message including information on an image sent from another electronic device through a chatroom of a messenger; and filtering, by the processing circuitry, an image corresponding to the chat message based on a keyword that is extracted from the image.

The receiving may include receiving a chat message including the keyword related to the image from a server of the messenger.

The keyword may be extracted through an object detection based on the image by a server of the messenger or the other electronic device.

The receiving may include receiving, from a server of the messenger, a chat message including a thumbnail of the image with respect to the image, and the image filtering method may further include extracting, by the processing circuitry, the keyword through an object detection based on the thumbnail.

The filtering may include limiting displaying of the image based on (e.g., in response to) the keyword being matched to a keyword set as an image filtering condition.

The filtering may include displaying the keyword without (e.g., by refraining from) displaying a thumbnail of the image based on displaying the chat message on the chatroom and the keyword being matched to a keyword set as an image filtering condition.

The filtering may include applying a filtering effect to a thumbnail of the image and displaying the thumbnail to which the filtering effect is applied based on displaying the chat message on the chatroom and the keyword being matched to a keyword set as an image filtering condition.

The filtering may include requesting a user authentication with respect to the image in the case of displaying the chat message on the chatroom, based on the keyword being matched to a keyword set as an image filtering condition.

The image filtering method may further include downloading, by the processing circuitry, the image from a server of the messenger and storing the downloaded image with the keyword based on an input of a user request for the image through the chatroom.

The image filtering method may further include recommending, by the processing circuitry, an image matched to an input keyword among the stored images based on an input of a message or the keyword for search into the chatroom.

The image filtering method may further include downloading, by the processing circuitry, and/or storing, by the processing circuitry, the image based on the keyword being matched to a preset specific keyword.

The filtering may include processing the image to be automatically hidden or deleted regardless of the image filtering condition based on the image corresponding to content of a specific type.

According to an aspect of at least one example embodiment, there is provided a non-transitory computer-readable record medium storing instructions that, when executed by processing circuitry, cause the processing circuitry to perform the image filtering method.

According to an aspect of at least one example embodiment, there is provided an electronic device including a memory; and processing circuitry configured to connect to the memory and to execute computer-readable instructions included in the memory. The processing circuitry may be further configured to receive a chat message including information on an image sent from another electronic device through a chatroom of a messenger and filter an image corresponding to the chat message based on a keyword that is extracted from the image.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
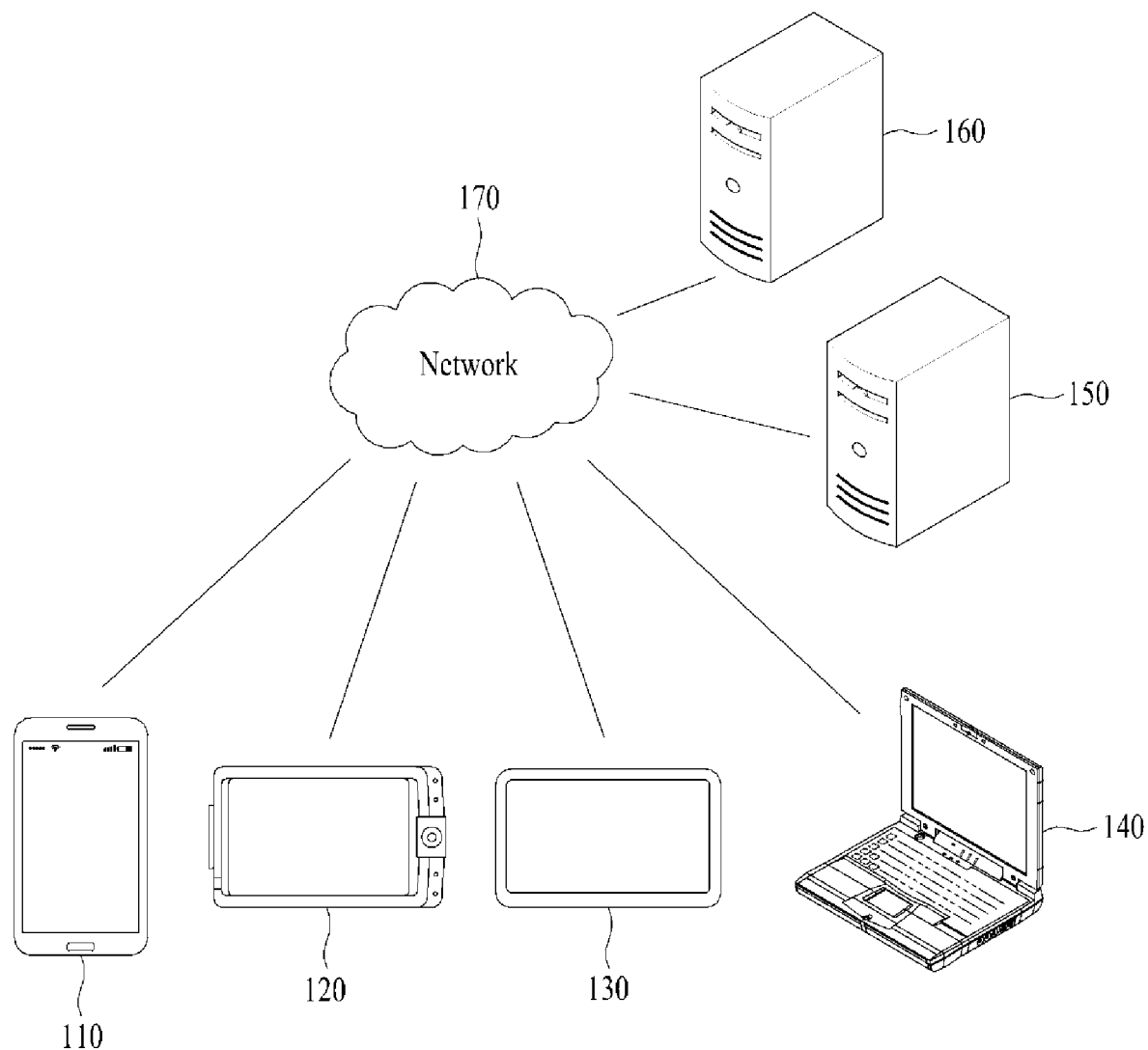
FIG. 1 illustrates an example of a network environment according to at least one example embodiment.

It should be noted that these figures are intended to illustrate the general characteristics of methods and/or structure utilized in some example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Each of the flowcharts presented and discussed herein depicts a set of operations that are arranged in a certain order. However, it is to be appreciated that the arrangement of the operations in each flowchart depicts only one example, and that operations may be added, removed, reordered, and/or performed concurrently in accordance with the subject matter of the present disclosure. All such variations that are reasonably and logically possible, and that are not contradictory with other statements, are intended to be included in this disclosure, the scope of which is to be understood as being limited only by the claims.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using processing circuitry. In some example embodiments, processing circuitry may include hardware such as logic circuits; a hardware/software combination, such as a processor executing software; or a combination thereof. For example, a processor may include, but not limited to, a central processing unit (CPU), a controller, an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), or any other device capable of responding to and executing instructions in a defined manner.

Software may include a computer program, program code, instructions, or some combination thereof, for independently or collectively instructing or configuring processing circuitry to operate as desired. The computer program and/or program code may include program or computer-readable instructions, software components, software modules, data files, data structures, and/or the like, capable of being implemented by processing circuitry. Examples of program code include both machine code produced by a compiler and higher level program code that is executed using an interpreter.

For example, when the processing circuitry includes a processor such as a central processing unit (CPU), a controller, an arithmetic logic unit (ALU), a digital signal processor, a microcomputer, a microprocessor, or the like, the processing circuitry may be configured to carry out program code by performing arithmetical, logical, and input/output operations, according to the program code. Once the program code is loaded into processing circuitry, the processing circuitry may be programmed to perform the program code, thereby transforming the processing circuitry into a special-purpose computer processing device. In a more specific example, when the program code is loaded into processing circuitry, the processing circuitry becomes programmed to perform the program code and operations corresponding thereto, thereby transforming the processing circuitry into a special-purpose computer processing device.

Software and/or data may be embodied permanently or temporarily in any type of machine, component, physical or virtual equipment, or computer storage medium or device, capable of providing instructions or data to, or being interpreted by, processing circuitry. The software also may be distributed over network coupled computer systems so that the software is stored and executed in a distributed fashion. For example, software and data may be stored by one or more computer readable storage mediums, including the tangible or non-transitory computer-readable storage media discussed herein.

According to one or more example embodiments, processing circuitry may be described as including various functional units that perform various operations and/or functions to increase the clarity of the description. However, processing circuitry is not intended to be limited to the functional units presented in the example embodiments. For example, in one or more example embodiments, various operations and/or functions of the functional units may be performed by other ones of the functional units. Further, in some example embodiments, processing circuitry may perform operations and/or functions of the various functional units without sub-dividing the operations and/or functions into these various functional units.

One or more example embodiments may also include one or more storage devices. The one or more storage devices may be tangible or non-transitory computer-readable storage media, such as random access memory (RAM), read only memory (ROM), a permanent mass storage device (such as a disk drive, solid state device such as a NAND flash device, and/or any other like data storage mechanism capable of storing and recording data). The one or more storage devices may be configured to store computer programs, program code, instructions, or some combination thereof, for one or more operating systems and/or for implementing some example embodiments described herein. The computer programs, program code, instructions, or some combination thereof, may also be loaded from a separate computer readable storage medium into the one or more storage devices and/or processing circuitry using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or processing circuitry from a remote data storage device via a network interface, rather than via a local computer readable storage medium. Additionally, the computer programs, program code, instructions, or some combination thereof, may be loaded into the one or more storage devices and/or processing circuitry from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The processing circuitry, the one or more storage devices, and/or the computer programs, program code, instructions, or some combination thereof, may be specially designed and constructed for the purposes of the example embodiments, or may be known devices that are altered and/or modified in accordance with some example embodiments.

Processing circuitry may be configured to run an operating system (OS) and one or more software applications that run on the OS. Processing circuitry also may be configured to access, store, manipulate, process, and create data in response to execution of the software. For simplicity, one or more example embodiments may be exemplified as processing circuitry; however, in other example embodiments, processing circuitry may include multiple processing elements and multiple types of processing elements. For example, processing circuitry may include multiple processors or a processor and a controller. In addition, other configurations of processing circuitry are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments are described with reference to the accompanying drawings.

Some example embodiments include technology for filtering an image.

Some example embodiments may automatically filter an image using a keyword extracted from the image. Some example embodiments may achieve one or more advantages, such as, for example, image regulation, image management, convenience, efficiency, and/or reduced resource utilization.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computer system. For example, in some example embodiments, each of the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, and/or an augmented reality (AR) device. For example, although FIG. 1 illustrates a shape of a smartphone as an example of the electronic device 110, the electronic device 110 may refer to one of various physical computer systems capable of communicating with other electronic devices 120, 130, and 140, and/or the servers 150 and 160 over the network 170 in a wired communication manner or in a wireless communication manner.

Some example embodiments may differ from the example of FIG. 1 and/or may not be limited such as shown in the example of FIG. 1. For example, some example embodiments may include communication using a near field communication among two or more devices as well as communication using a communication network, for example, a mobile communication network, the wired Internet, the wireless Internet, a broadcasting network, and/or a satellite network, which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and/or the Internet. Also, the network 170 may include at least one of network topologies that include a bus network, a star network, a ring network, a mesh network, a star-bus network, a tree or hierarchical network, and the like. However, such communication and network architectures are only examples and some example embodiments are not limited thereto.

In some example embodiments, such as shown in FIG. 1, each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the server 150 may be a system that provides a first service to the plurality of electronic devices 110, 120, 130, and/or 140 over the network 170. The server 160 may be a system that provides a second service to the plurality of electronic devices 110, 120, 130, and/or 140 over the network 170. In some example embodiments, a server 150 may provide, as the first service, a service, for example, a messenger service, utilized by a corresponding application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
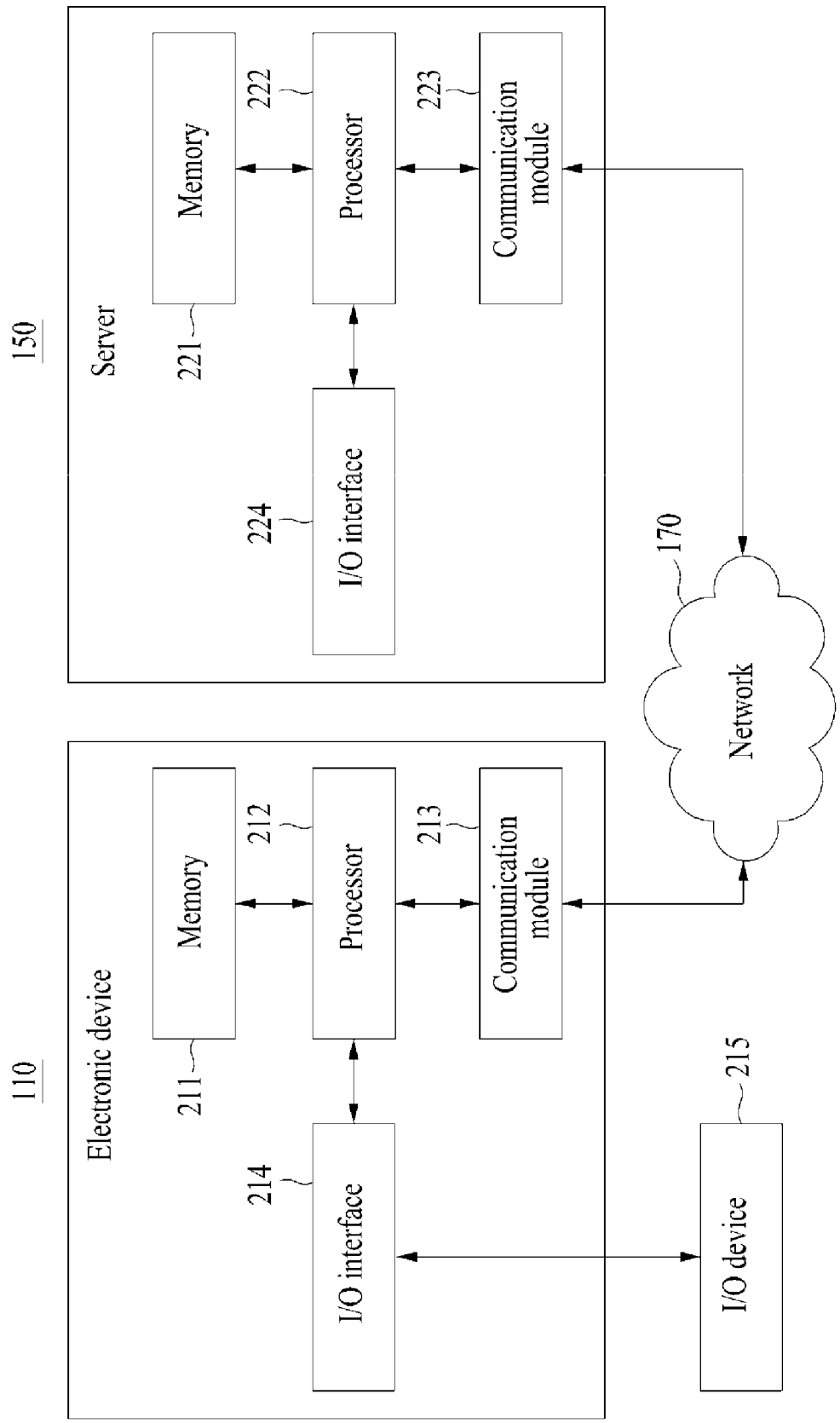
FIG. 2 illustrates an example of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

In some example embodiments, such as shown in FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a volatile or nonvolatile mass storage device, such as random access memory (RAM), a read only memory (ROM), a disk drive, a solid state drive (SSD), and a flash memory, as an example of a non-transitory computer-readable storage medium. The volatile or nonvolatile mass storage device, such as ROM, SSD, flash memory, and disk drive, may be included in the electronic device 110 or the server 150 as a storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable storage medium separate from the memory 211, 221. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a computer program, for example, the application, installed by files provided over the network 170 from developers or a file distribution system, for example, the server 160, which may be configured to provide an installation file of the application.

In some example embodiments, such as shown in FIG. 2, the processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

In some example embodiments, such as shown in FIG. 2, The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may be configured to transfer a request created based on a program code stored in the storage device, such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 through the communication module 223 and the network 170. For example, a control signal, an instruction, content, a file, etc., of the server 150 received through the communication module 213 may be transferred to the processor 212 or the memory 211, and content, such as a file, may be stored in a storage medium further includable in the electronic device 110.

In some example embodiments, such as shown in FIG. 2, The I/O interface 214 may be a device used for interface with an I/O device 215. For example, an input device may include a device, such as a keyboard, a mouse, a microphone, and a camera, and an output device may include a device, such as a display, a speaker, and a haptic feedback device. As another example, the I/O interface 214 may be a device for interface with an apparatus in which an input function and an output function are integrated into a single function, such as a touchscreen. The I/O device 215 may be configured as a single device with the electronic device 110. Also, the I/O interface 224 of the server 150 may be configured to interface with an apparatus (not shown) for input or output that may be connected to the server 150 or included in the server 150. In some example embodiments, when processing instructions of the computer program loaded to the memory 211, the processor 212 of the electronic device 110 may be configured to display a service screen configured using data provided from the server 150 or the electronic device 120, or may display content on a display through the I/O interface 214.

According to some example embodiments, the electronic device 110 and the server 150 may include a number of components greater or less than a number of components shown in FIG. 2. However, example embodiments presented herein may, for convenience, show only a few components, rather than many, components. For example, the electronic device 110 may include at least a portion of the I/O device 215, or may further include other components, for example, a transceiver, a global positioning system (GPS) module, a camera, a variety of sensors, a database (DB), and the like. In some example embodiments, if the electronic device 110 is a smartphone, the electronic device 110 may further include a variety of components, for example, an accelerometer sensor, a gyro sensor, a camera module, various physical buttons, a button using a touch panel, an I/O port, and/or a vibrator for vibration, which are generally included in the smartphone.

Figure 3:
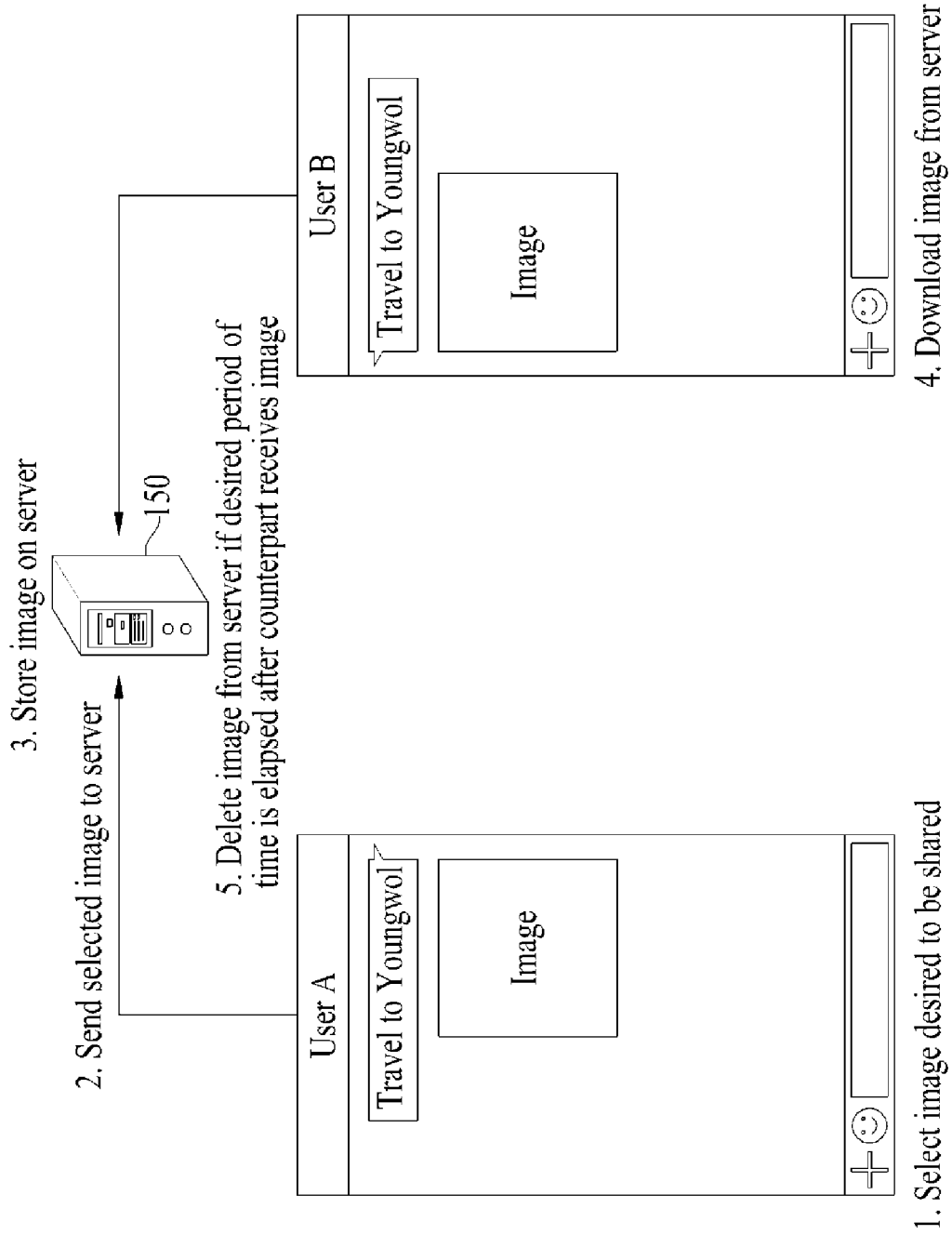
FIG. 3 illustrates an example of a basic technology scenario for sending an image on a messenger according to at least one example embodiment.

FIG. 3 illustrates an example of a scenario for sending an image on a messenger according to at least one example embodiment.

Hereinafter, an example of a process of sending and receiving an image between users through a messenger is described with reference to FIG. 3.

In operation 1, a user, for example, a user A, of the electronic device 110 may interact with a messenger installed on the electronic device 110 and select an image that the user A desires to share with another user, for example, a user B, of the electronic device 120 in a chatroom with the user B. In the example of FIG. 3, The chatroom refers to a messenger chat screen corresponding to a communication session established between an account of the user A and an account of the user B.

In operation 2, the electronic device 110 sends the image selected by the user A to the server 150 based on (e.g., in response to) a file send request of the messenger.

In operation 3, the server 150 receives the image to be sent to the user B from the electronic device 110 and stores the received image in a file database, for example, the memory 221.

In operation 4, the electronic device 120 downloads the image sent from the user A from the server 150 based on a request from the user B through a chatroom with the user A on the messenger.

In operation 5, the server 150 stores the image sent from the user A to the user B and deletes the corresponding image from a file database if a desired period of time is elapsed after the user B downloads the image.

In some example embodiments, a server 150 may directly send an image file sent from the user A to the user B. In some other example embodiments, a server 150 may initially send an image type message including a thumbnail of the corresponding image as a chat message related to the image, and may download the image file to the electronic device 120 if a request is received from the user B.

Hereinafter, examples of a method and system for filtering an image are described.

The term "image" used herein may inclusively indicate all of image-based contents, for example, a video and a still image such as a photo.

Figure 4:
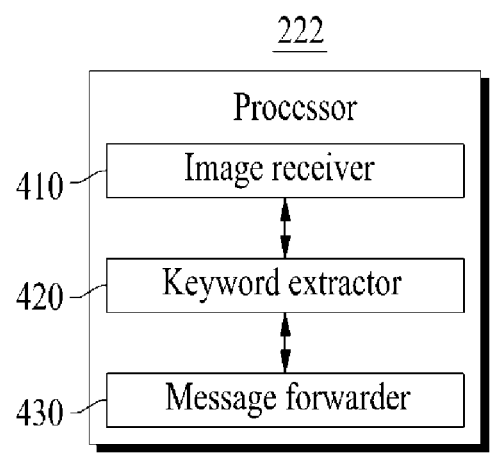
FIG. 4 illustrates an example of components includable in a processor of a server according to at least one example embodiment.
Figure 5:
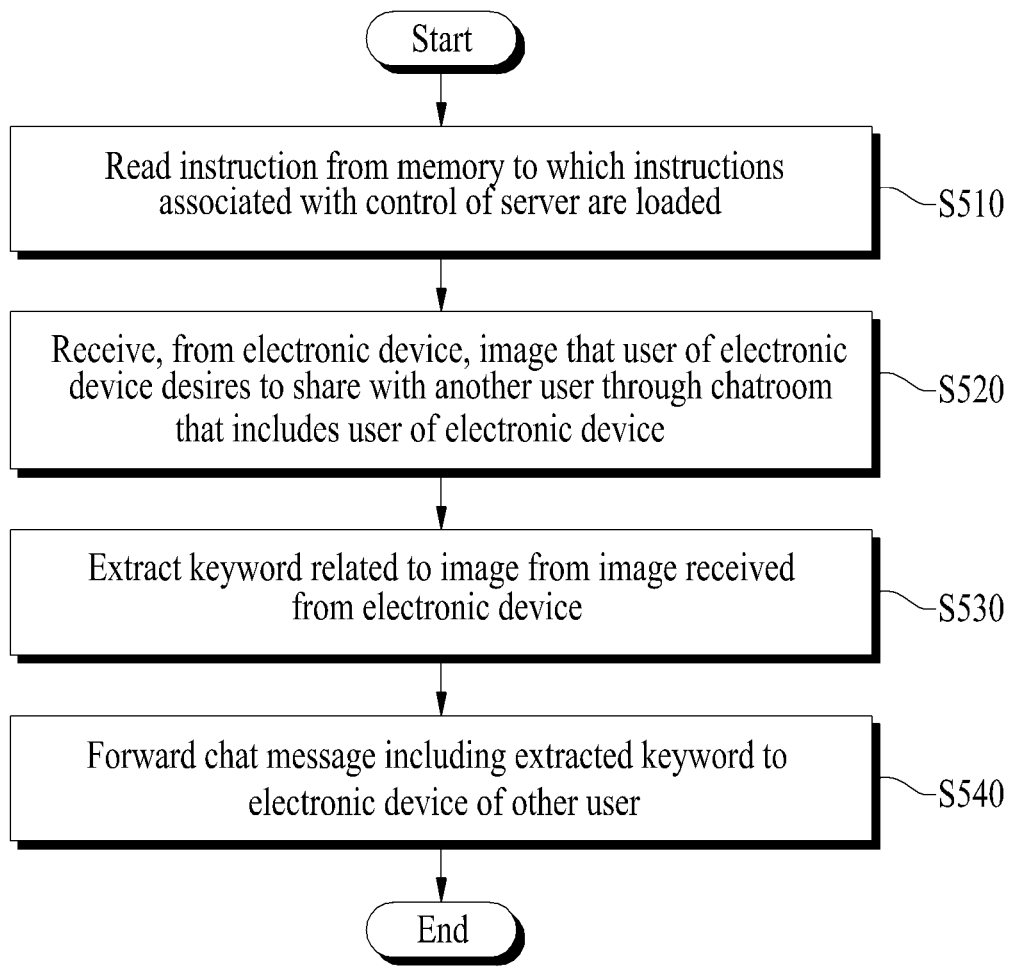
FIG. 5 is a flowchart illustrating an example of a method performed by a server according to at least one example embodiment.

FIG. 4 illustrates an example of components includable in a processor of a server according to at least one example embodiment, and FIG. 5 is a flowchart illustrating an example of a method performed by a server according to at least one example embodiment.

In some example embodiments such as shown in FIGS. 4 and 5, the server 150 according to at least one example embodiment serves as a platform that provides a messenger service to the plurality of electronic devices 110, 120, 130, and/or 140 that are clients. In some example embodiments, the server 150 may be configured to provide a messenger service through interaction with an application installed on each of the electronic devices 110, 120, 130, and/or 140.

In some example embodiments, a server 150 may perform the image filtering method of FIG. 5. Referring to FIG. 4, the processor 222 of the server 150 may include an image receiver 410, a keyword extractor 420, and/or a message forwarder 430 as components. In some example embodiments, the components of the processor 222 may be selectively included in or excluded from the processor 222. Also, in some example embodiments, the components of the processor 222 may be separated and/or merged for functional representation of the processor 222.

In some example embodiments, the processor 222 and the components of the processor 222 may control the server 150 to perform operations S510 to S540 included in the image filtering method of FIG. 5. In some example embodiments, the processor 222 and the components of the processor 222 may be configured to execute an instruction according to a code of at least one program and a code of an OS included in the memory 221.

In some example embodiments, the components of the processor 222 may be representations of different functions of the processor 222 performed by the processor 222 in response to an instruction provided from a program code stored on the server 150. For example, an image receiver 410 may be used as a functional representation of a processor 222 that controls a server 150 based on the instruction, such that the server 150 may receive an image to be shared through a chatroom.

In some example embodiments, such as shown in FIG. 5, in operation S510, the processor 222 may read an instruction from the memory 221 to which instructions associated with control of the server 150 are loaded. In this case, the read instruction may include an instruction for controlling the processor 222 to perform operations S520 to S540.

In operation S520, the image receiver 410 may receive, from the electronic device 110, an image that the user of the electronic device 110 desires to share with another user through a chatroom that includes the user of the electronic device 110.

In operation S530, the keyword extractor 420 may extract a keyword related to the image from the image received from the electronic device 110. For example, the keyword extractor 420 may recognize the keyword related to the image by recognizing an object included in the image through an object detection and by acquiring a name of the recognized object. The keyword extractor 420 may include a machine learning engine, for example, TensorFlow, and may apply an object detection algorithm based on a deep learning model that is pretrained using a learning image set. Based on an input of the received image from the electronic device 110, the keyword extractor 420 may find an object included in the image through the object detection algorithm based on the deep learning model and/or may extract a feature of the object. In some example embodiments, the keyword extractor 420 may extract a feature of the detected object from the image by applying the learning model that is modeled based on various attributes, for example, a color, a texture, and a category, which may enable an object classification. In some example embodiments, in addition to the aforementioned method, the keyword extractor 420 may extract a feature included in the image using at least one of various image recognition algorithms, for example, scale invariant feature transform (SIFT), speeded-up robust features (SURF), histogram of oriented gradient (HOG), and/or modified census transform (MCT) algorithms. In some example embodiments, the keyword extractor 420 may extract a keyword from the image by calculating a similarity between the extracted feature and a feature of the object registered in advance to a database, for example, the memory 221, of the server 150 or another database interacting with the server 150. In some example embodiments, in addition to the keyword extraction, the keyword extractor 420 may classify a specific type of content, for example, sexually explicit materials, based on an image analysis result.

In operation S540, the message forwarder 430 may forward a chat message including the keyword extracted in operation S530 to the electronic device 120 of the other user through the chatroom, with respect to the image received from the electronic device 110. Once the user of the electronic device 110 uploads the image through the chatroom, the server 150 may store the image as data associated with the chatroom, for example, may store the image with the keyword extracted from the image. In some example embodiments, the message forwarder 430 may forward, to a counterpart, the chat message including information on the image uploaded by the user of the electronic device 110. That is, the message forwarder 430 may initially forward an image type message including information on the image instead of immediately forwarding the image file. In some example embodiments, when forwarding the image type message, the message forwarder 430 may forward the keyword extracted from the image. As described herein, some image type messages may include a keyword extracted from the image and/or may include a thumbnail of the image with the extracted keyword. Accordingly, with respect to an image desired to be shared through a chatroom, the server 150 may extract a keyword from the image and/or may forward a chat message including the extracted keyword to the corresponding chatroom.

Figure 6:
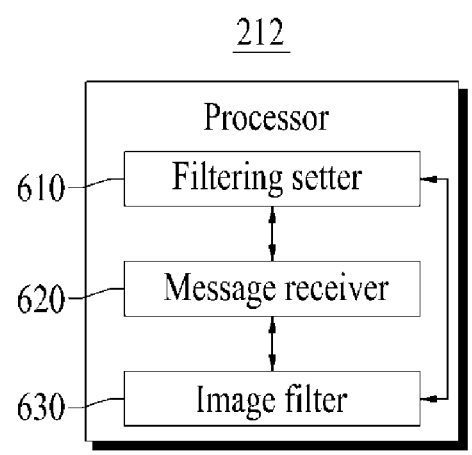
FIG. 6 illustrates an example of components includable in a processor of an electronic device according to at least one example embodiment.
Figure 7:
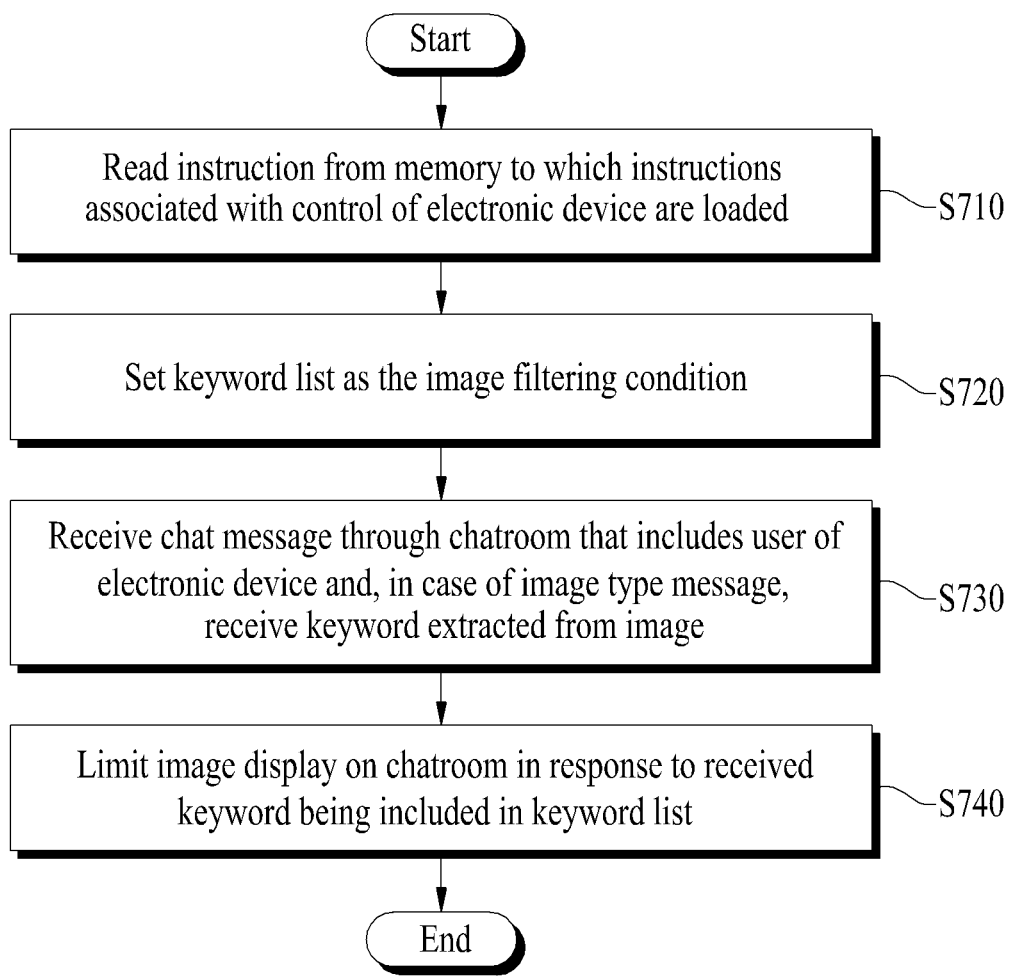
FIG. 7 is a flowchart illustrating an example of a method performed by an electronic device according to at least one example embodiment.

FIG. 6 illustrates an example of components includable in a processor of an electronic device according to at least one example embodiment, and FIG. 7 is a flowchart illustrating an example of a method performed by an electronic device according to at least one example embodiment.

An image filtering system configured as a computer may be configured in the electronic device 110 according to the example embodiment. For example, the image filtering system may be configured in a form of a program that is configured to independently operate and/or in an in-app form of a specific application to be operable on the specific application, and/or may be configured to perform image filtering, such as through interaction with the server 150.

Based on an instruction provided from an application installed on the electronic device 110, the image filtering system of the electronic device 110 may be configured to perform the image filtering method of FIG. 7. Referring to FIG. 6, to perform the image filtering method, the processor 212 of the electronic device 110 may include a filtering setter 610, a message receiver 620, and an image filter 630. Depending on example embodiments, the components of the processor 212 may be included in or excluded from the processor 212. Also, depending on example embodiments, the components of the processor 212 may be separated or merged for functional representation of the processor 212.

In some example embodiments, such as shown in FIG. 6, a processor 212 and/or components of the processor 212 may be configured to control the electronic device 110 to perform operations S710 to S740 included in the image filtering method of FIG. 7. For example, the processor 212 and the components of the processor 212 may be configured to execute an instruction according to a code of at least one program and a code of an OS included in the memory.

In some example embodiments, such as shown in FIG. 6, components of the processor 212 may be representations of different functions of the processor 212 performed by the processor 212 based on an instruction provided from a program code stored on the electronic device 110, for example, an instruction provided from the application executed on the electronic device 110. For example, the filtering setter 610 may be used as a functional representation of the processor 212 that controls the electronic device 110 based on the instruction, such that the electronic device 110 may set an image filtering condition.

Referring to FIG. 7, in operation S710, the processor 212 may read an instruction from the memory 211 to which instructions associated with control of the electronic device 110 are loaded. In this case, the read instruction may include an instruction for configuring the processor 212 to perform operations S720 to S740.

In operation S720, the filtering setter 610 may set a keyword list including at least one keyword as an image filtering condition. In some example embodiments, the keyword list for image filtering may be set by the user of the electronic device 110 and/or may further include a keyword that is determined as a default value based on information, for example, age, associated with the user of the electronic device 110. The keyword list may be collectively set with respect to the entire chatrooms of a messenger installed on the electronic device 110, or may be set as an individual condition for each chatroom.

In operation S730, the message receiver 620 may receive a chat message sent from another user through the chatroom that includes the user of the electronic device 110. Here, when the received chat message is an image type message including information on an image sent from the other user, the image receiver 620 may receive a keyword extracted from the corresponding image. That is, with respect to the image sent to the user of the electronic device 110 through the chatroom, the message receiver 620 may receive, from the server 150, the chat message including the keyword extracted from the image. In some example embodiments, the chat message may further include a thumbnail of the image sent to the user of the electronic device 110.

In operation S740, for an image type message involved in displaying the chat message that is sent and/or received with the user of the electronic device 110 on the chatroom, the image filter 630 may limit image display on the chatroom based on the keyword received with the corresponding chat message being included in the keyword list. The image filter 630 may store a keyword extracted from a corresponding image on a local storage space, for example, the memory 211, for each image type message and/or may perform image filtering based on the stored keyword being matched to a keyword set as the image filtering condition. For example, the image filter 630 may represent the image received through the chatroom as an image to be filtered by displaying, on the chatroom, only the keyword included in the image type message, that is, the keyword extracted from the image. As another example, based on displaying the image type message on the chatroom, a thumbnail of the corresponding message may be displayed. In this case, the image filter 630 may apply a filtering effect, for example, a blurring process, of limiting the image display to the thumbnail and/or may represent that the image received through the chatroom is an image to be filtered. As another example, based on displaying the image type message on the chatroom, the image filter 630 may request a separate authentication, for example, an adult verification and/or a password verification, and/or may represent that the image received through the chatroom is an image to be filtered. Once a user request is input or authentication is completed with respect to the image to be filtered, the image filter 630 may be configured to request the server 150 to download the corresponding image and/or may be configured to store the downloaded image on the local storage space. Here, the image filter 630 may store a keyword extracted from a corresponding image for each downloaded image.

In some example embodiments, based on the image sent to the user of the electronic device 110 corresponding to sexually explicit content, the image filter 630 may be configured to process the image to be automatically hidden and/or deleted regardless of the image filtering condition. On the contrary to limiting the image display, based on the image sent to the user of the electronic device 110 being an image matched to a specific keyword preset by the user, the image filter 630 may be configured to download the image and/or may be configured to store the downloaded image on the local storage space automatically, that is, even if a separate user request is not received. In some example embodiments, the image filter may be configured to download the image immediately; in other example embodiments, an image filter may be configured to download the image after a period of time and/or based on a request of a user. In some example embodiments, for accessibility of a visually impaired person, the image filter 630 may be configured to output a keyword extracted from the corresponding image as voice through a text-to-speech (TTS) scheme based on to receiving the image type message through the chatroom. In some example embodiments, based on a keyword being input to a message input box or a search box of the chatroom, the image filter 630 may be configured to automatically recommend an image matched to the keyword among images downloaded through the chatroom.

In some example embodiments, a client side on which a messenger is installed may be configured to perform image filtering for an image sent and received through a chatroom of the messenger using a keyword extracted from the image.

In some example embodiments, an entity that is configured to extract a keyword related to an image may be the server 150. Depending on cases, a sending side client or a receiving side client may be the entity that is configured to extract a keyword.

Figure 8:
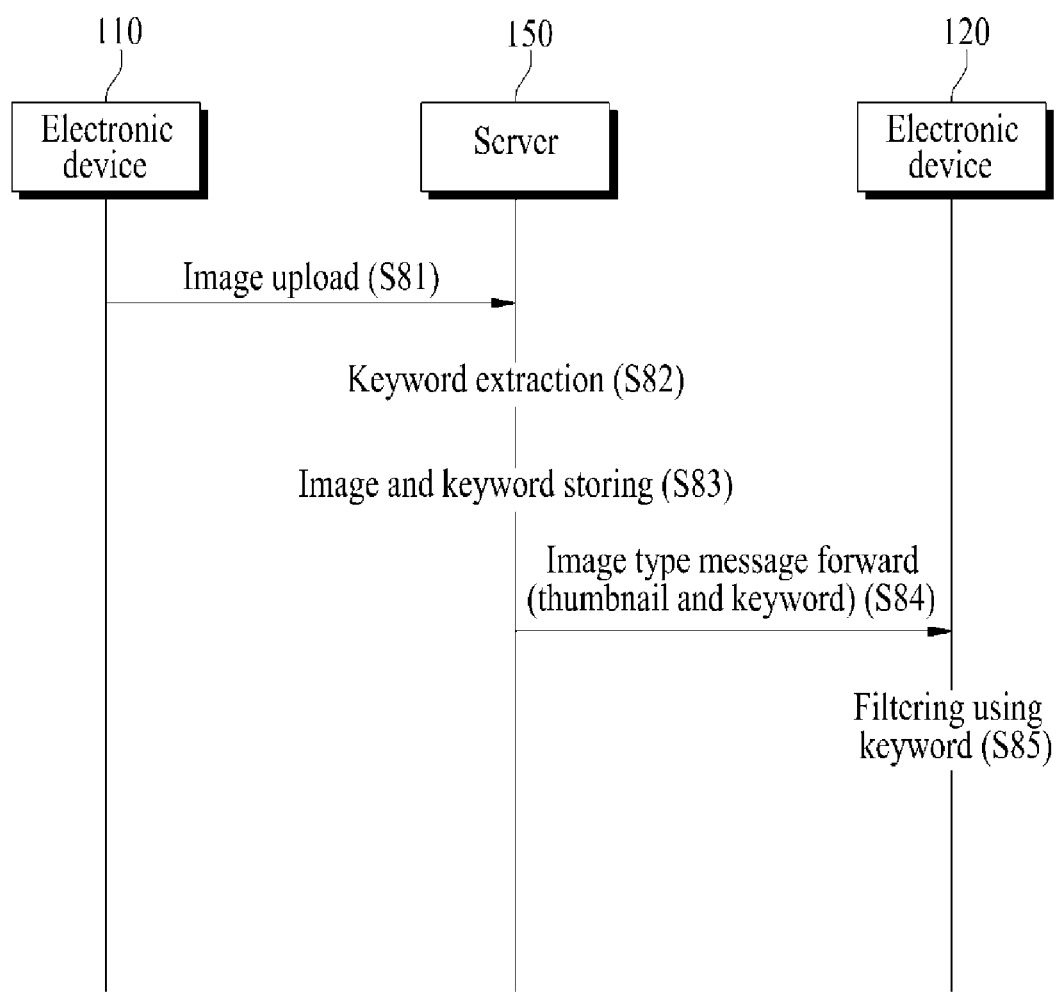
FIGS. 8 to 10 illustrate examples of an image filtering process according to at least one example embodiment.
Figure 9:
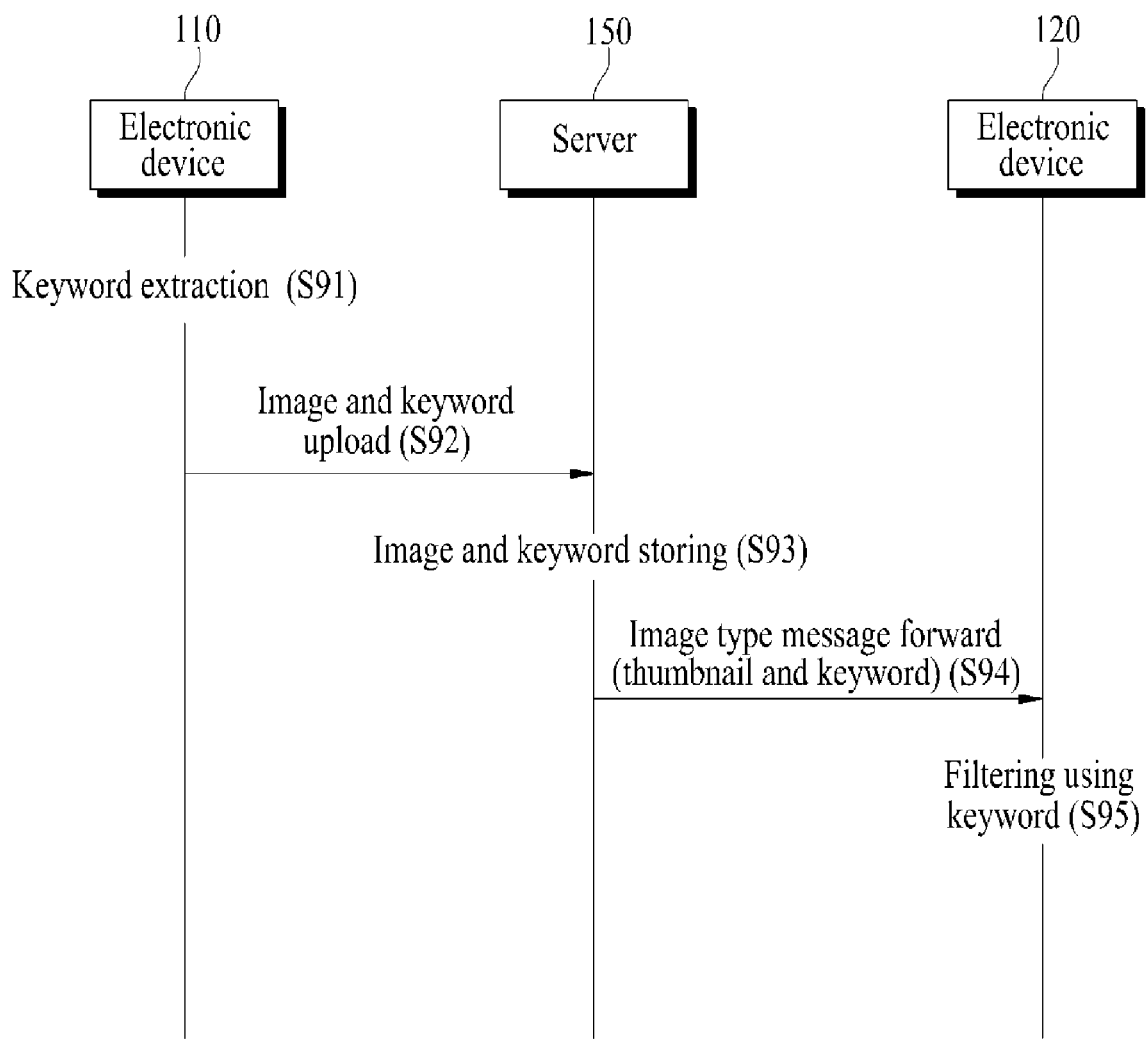
Figure 10:
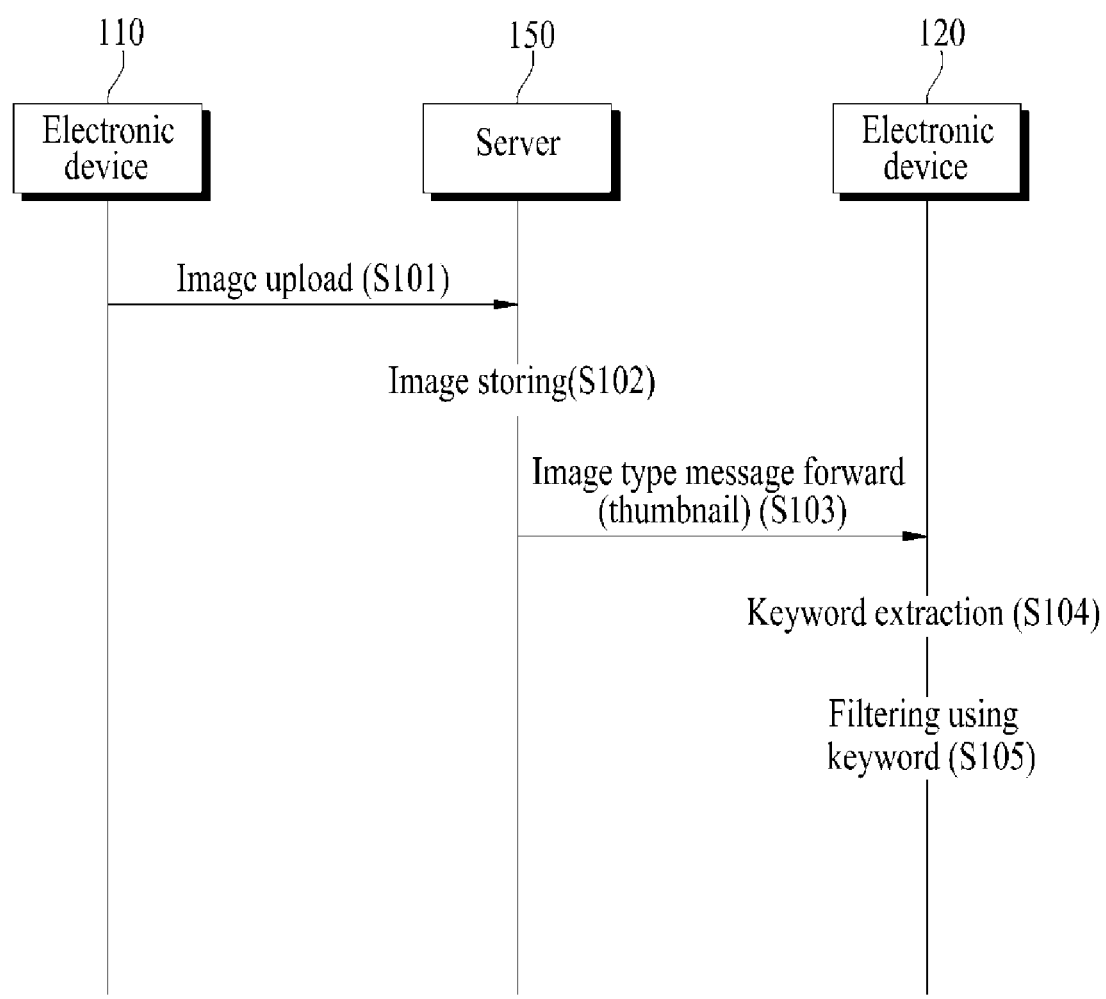

FIGS. 8 to 10 illustrate examples of an image filtering process according to at least one example embodiment. Here, it is assumed that the user of A of the electronic device 110 sends an image to the user B of the electronic device 120.

FIG. 8 illustrates an example of an image filtering process if the server 150 is configured as a keyword extraction entity.

Referring to FIG. 8, in operation S81, based on a selection of an image that the user A desires to share through a chatroom with the user B from the user A, the electronic device 110 may upload the selected image to the server 150.

In operation S82, based on receiving the image from the electronic device 110, the server 150 may extract a keyword related to the image from the selected image.

In operation S83, the server 150 may store the image received from the electronic device 110 with the keyword extracted from the corresponding image.

In operation S84, the server 150 may forward an image type message to the electronic device 120 of the user B as a chat message related to the image received from the electronic device 110, that is, the image sent from the user A.

In some example embodiments, an image type message that is forwarded to the electronic device 120 may include the keyword extracted from the image and/or may include a thumbnail of the image with the keyword extracted from the image.

In operation S85, based on the image type message during a process of displaying the chat message sent and received with the user A on a chatroom with the user A, the electronic device 120 may perform image filtering on the corresponding chatroom based on the keyword extracted from the image.

FIG. 9 illustrates an example of an image filtering process if the electronic device 110 that is a sending side client is a keyword extraction entity in accordance with some example embodiments.

Referring to FIG. 9, in operation S91, based on a selection of an image that the user A desires to share through a chatroom with the user B from the user A, the electronic device 110 may extract a keyword related to the image from the selected image.

In some example embodiments, the electronic device 110 may be configured to provide the extracted keyword to the user A through an edit screen before uploading the image to the server 150. Through the edit screen, the user A may verify the extracted keyword and may directly edit, for example, correct, add, delete, and the like, the keyword.

In operation S92, the electronic device 110 may store, on a local storage space, the keyword related to the image, for example, the extracted keyword or the edited keyword, selected by the user A and/or may be configured to upload the same to the server 150.

In operation S93, the server 150 may store the keyword with the image received from the electronic device 110.

In operation S94, the server 150 may forward an image type message to the electronic device 120 of the user B through a corresponding chatroom as a chat message related to the image sent from the electronic device 110, that is, the image sent from the user A.

In some example embodiments, an image type message forwarded to the electronic device 120 may include the keyword extracted from the image and/or may include a thumbnail of the corresponding image with the extracted keyword.

In operation S95, based on an image type message during a process of displaying the chat message sent and received with the user A on a chatroom with the user A, the electronic device 120 may perform image filtering on the corresponding chatroom based on the keyword extracted from the image.

FIG. 10 illustrates an example of an image filtering process if the electronic device 120 that is a receiving side client is configured as a keyword extraction entity in accordance with some example embodiments.

In some example embodiments, such as shown in FIG. 10, in operation S101, based on a selection of an image that the user A desires to share through a chatroom with the user B from the user A, the electronic device 110 may upload the selected image to the server 150.

In operation S102, based on receiving the image from the electronic device 110, the server 150 may store the received image.

In operation S103, the server 150 may forward an image type message to the electronic device 120 of the user B as a chat message related to the image received from the electronic device 110, that is, the image sent from the user A.

In some example embodiments, an image type message forwarded to the electronic device 120 may include a thumbnail of the image.

In operation S104, based on an image type message during a process of displaying the chat message exchanged with the user A on a chatroom with the user A, the electronic device 120 may extract a keyword related to the image from a thumbnail of the image.

In operation S105, the electronic device 120 may store the keyword and the thumbnail of the image sent from the user A on a local storage space and/or may be configured to perform image filtering on the corresponding chatroom based on the keyword extracted from the thumbnail.

An entity that extracts the keyword related to the image may be configured as a keyword extraction entity based on a learning model for a keyword extraction in a sending side client and/or a receiving side client in addition to the server 150.

In some example embodiments, based on a keyword extracted from the image being included in a keyword list set as a filtering condition, a receiving side client may be configured to limit image display on the chatroom.

Figure 11:
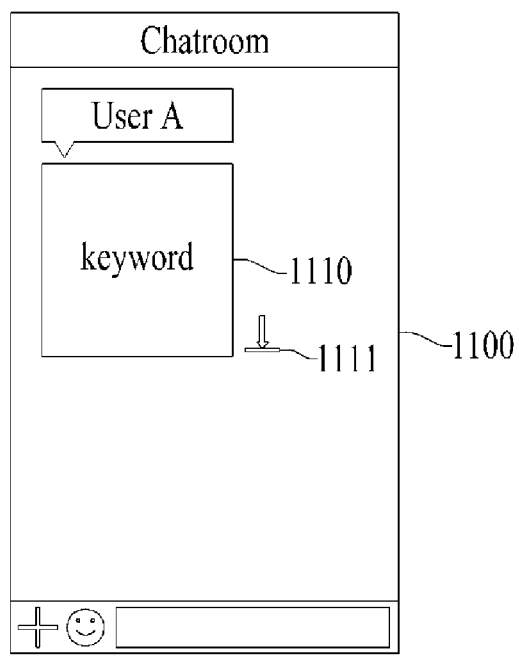
FIGS. 11 and 12 illustrate examples of a chatroom screen on which an image display is limited according to at least one example embodiment.
Figure 12:
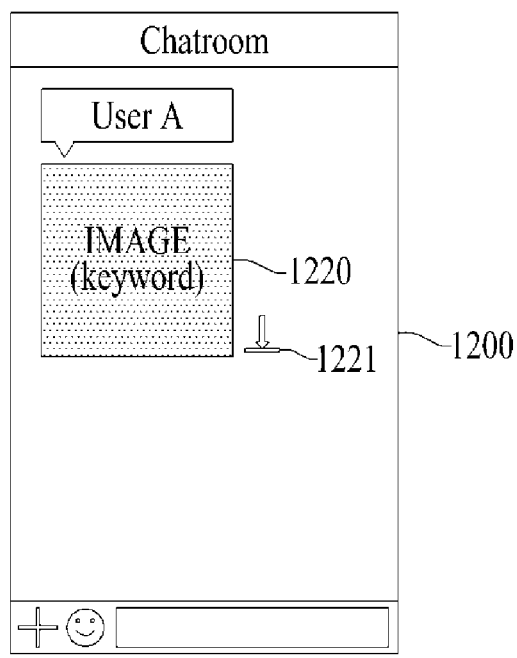

FIGS. 11 and 12 illustrate examples of a chatroom screen on which an image display is limited according to at least one example embodiment.

In some example embodiments, such as shown in FIG. 11, the electronic device 120 may be configured to display, for a user A, a chat message sent and/or received with the user A on a chatroom 1100. For example, based on an image sent from the user A, the electronic device 120 may be configured to limit an image display, such as by displaying an image type message 1110 using only a keyword extracted from the image without (e.g., by refraining from) displaying a thumbnail.

In some example embodiments, such as shown in FIG. 12, based on displaying an image type message 1220 using a thumbnail of the image on a chatroom 1200 with the user A, the electronic device 120 may be configured to limit an image display by performing a blurring process on the thumbnail.

Based on an image to be filtered of which display is limited, and/or based on an input of a download menu 1111, 1221 associated with the image type message 1110, 1220 from the user B, the electronic device 120 may be configured to request the server 150 to download an image corresponding to the image type message 1110, 1220 and/or may be configured to store the downloaded image, for example, on a local storage space.

As described above, according to example embodiments, with respect to an image desired to be shared through a chatroom, it is possible to perform automatic filtering of the image using a keyword extracted from the image.

The foregoing description has been provided for purposes of illustration and description. It is not intended to be exhaustive or to limit the disclosure. Individual elements or features of a particular example embodiment are generally not limited to a particular embodiment, but, where applicable, may be interchangeable and/or may be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An image filtering method implemented on an electronic device comprising processing circuitry configured to execute computer-readable instructions included in a memory, the image filtering method comprising:
  receiving, by the processing circuitry, a chat message including information on an image sent from another electronic device through a chatroom of a messenger;
  filtering, by the processing circuitry, the image corresponding to the chat message based on a keyword that is extracted from the image; and
  subsequent to the filtering, displaying either the keyword extracted from the image or a blurred thumbnail of the image, instead of the image itself or a thumbnail of the image that has a larger data size, on a display of the electronic device based on the keyword matching at least one keyword established as an image filtering condition.

2. The image filtering method of claim 1, wherein the receiving includes receiving, from a server of the messenger, the chat message including the keyword related to the image.

3. The image filtering method of claim 1, wherein the keyword is extracted through an object detection based on the image.

4. The image filtering method of claim 1, wherein
  the receiving includes receiving, from a server of the messenger, the chat message including the thumbnail of the image with respect to the image, and
  the image filtering method includes extracting, by the processing circuitry, the keyword through an object detection based on the thumbnail.

5. The image filtering method of claim 1, wherein the displaying includes displaying the chat message on the chatroom including the keyword and refraining from including the thumbnail of the image based on the keyword matching the at least one keyword established as the image filtering condition.

6. The image filtering method of claim 1, wherein the displaying comprises:
   displaying the chat message on the chatroom, and
   based on the keyword matching the at least one keyword established as the image filtering condition,
      applying a filtering effect to the thumbnail of the image, and
      displaying the thumbnail to which the filtering effect is applied as the blurred thumbnail.

7. The image filtering method of claim 1, wherein the displaying comprises:
   displaying the chat message on the chatroom, and
   requesting a user authentication with respect to the image based on the keyword matching the at least one keyword established as the image filtering condition.

8. The image filtering method of claim 1, further comprising:
   downloading, by the processing circuitry, the image from a server of the messenger; and
   storing, by the processing circuitry, the image with the keyword based on an input of a user request for the image through the chatroom.

9. The image filtering method of claim 8, further comprising:
   recommending, by the processing circuitry, a specific image matched to an input keyword among stored images based on an input of a message or a word for search into the chatroom.

10. The image filtering method of claim 1, further comprising:
    downloading, by the processing circuitry, the image based on the keyword being matched to a preset specific keyword; and
    storing, by the processing circuitry, the image.

11. The image filtering method of claim 1, wherein the displaying includes processing the image to be automatically hidden or deleted regardless of the image filtering condition based on the image corresponding to content of a specific type.

12. The image filtering method of claim 1, further comprising:
    extracting the keyword by applying an object detection algorithm based on a deep learning model that is pretrained using a learning image set.

13. A non-transitory computer-readable record medium storing the computer-readable instructions that, when executed by the processing circuitry, cause the electronic device to perform the image filtering method of claim 1.

14. An electronic device comprising:
    a memory; and
    processing circuitry configured to connect to the memory and to execute computer-readable instructions included in the memory, wherein the processing circuitry is configured to,
       receive a chat message including information on an image sent from another electronic device through a chatroom of a messenger,
       filter the image corresponding to the chat message based on a keyword that is extracted from the image; and
    subsequent to the filtering, display either the keyword extracted from the image or a blurred thumbnail of the image, instead of the image itself or a thumbnail of the image that has a larger data size, on a display of the electronic device based on the keyword matching at least one keyword established as an image filtering condition.

15. The electronic device of claim 14, wherein the processing circuitry is further configured to receive, from a server of the messenger, the chat message including the keyword related to the image.

16. The electronic device of claim 14, wherein the keyword is extracted through an object detection based on the image.

17. The electronic device of claim 14, wherein the processing circuitry is further configured to,
    receive, from a server of the messenger, the chat message including the thumbnail of the image with respect to the image, and
    extract the keyword through an object detection based on the thumbnail.

18. The electronic device of claim 14, wherein the processing circuitry is further configured to, based on the keyword matching the at least one keyword established as the image filtering condition,
    display the chat message on the chatroom, and
    display the keyword and refrain from displaying the thumbnail of the image.

19. The electronic device of claim 14, wherein the processing circuitry is further configured to,
    display the chat message on the chatroom, and
    based on the keyword matching the at least one keyword established as the image filtering condition,
       apply a filtering effect to the thumbnail of the image, and
       display the thumbnail to which the filtering effect is applied as the blurred thumbnail.

20. The electronic device of claim 14, wherein the processing circuitry is further configured to,
    display the chat message on the chatroom, and
    request a user authentication with respect to the image based on the keyword matching the at least one keyword established as the image filtering condition.

* * * * *